United States Patent
Leum et al.

(10) Patent No.: US 12,486,127 B2
(45) Date of Patent: *Dec. 2, 2025

(54) VEHICLE LEVELER WITH LIGHTING SAFETY FEATURES

(71) Applicant: Leum Engineering, Inc., Minnetonka, MN (US)

(72) Inventors: Grant Leum, Excelsior, MN (US); Eric Demerath, Shepherd, MI (US)

(73) Assignee: Leum Engineering, Inc., Minnetonka, MN (US)

( * ) Notice: Subject to any disclaimer, the term of this patent is extended or adjusted under 35 U.S.C. 154(b) by 977 days.

This patent is subject to a terminal disclaimer.

(21) Appl. No.: 17/590,056

(22) Filed: Feb. 1, 2022

(65) Prior Publication Data
US 2022/0162021 A1 May 26, 2022

Related U.S. Application Data

(63) Continuation-in-part of application No. 17/550,870, filed on Dec. 14, 2021, which is a continuation-in-part of application No. 17/468,882, filed on Sep. 8, 2021, now Pat. No. 12,214,979, which is a continuation-in-part of application No. 17/355,160, filed on Jun. 22, 2021, now Pat. No. 12,024,411, which is a continuation-in-part of application No. 17/340,670, filed on Jun. 7, 2021, now Pat. No. 12,006,170, which is a continuation-in-part of application No. 17/322,889, filed on May 17, 2021, now Pat. No. 11,772,915, which is a continuation-in-part of application No. 17/174,301, filed on Feb. 11, 2021, now Pat. No. 11,511,954, which is a continuation-in-part of (Continued)

(51) Int. Cl.
*B65G 69/00* (2006.01)
*B60Q 1/30* (2006.01)
*B65G 69/28* (2006.01)

(52) U.S. Cl.
CPC ......... *B65G 69/2882* (2013.01); *B60Q 1/307* (2013.01); *B65G 69/005* (2013.01); *B65G 69/006* (2013.01); *B65G 69/2811* (2013.01)

(58) Field of Classification Search
CPC  B65G 69/005; B65G 69/006; B65G 69/2811; B65G 69/2882; B60Q 1/307
USPC ........................................................ 14/69.5
See application file for complete search history.

(56) References Cited

U.S. PATENT DOCUMENTS

| | | | |
|---|---|---|---|
| 2,798,620 A * | 7/1957 | Allan | B65G 69/006 414/385 |
| 4,348,780 A | 9/1982 | Angelo et al. | |

(Continued)

*Primary Examiner* — Raymond W Addie
(74) *Attorney, Agent, or Firm* — Jansson Munger & McKinley Ltd.

(57) ABSTRACT

The vehicle leveler includes a first portion which has a leading edge and a trailing edge, the trailing edge is disposed further from the driveway than the leading edge. The embodiment also includes a second portion which has a leading edge and a trailing edge, the leading edge of the second portion is attached to the trailing edge of the first portion and the leading edge of the second portion is disposed further from the driveway than the trailing edge of the second portion. The device has opposing side portions and a walkway. The opposing side portions include at least one or more lights which illuminate the leveler and the walkway.

29 Claims, 19 Drawing Sheets

Related U.S. Application Data application No. 17/026,642, filed on Sep. 21, 2020, now Pat. No. 11,273,998, which is a continuation-in-part of application No. 16/376,910, filed on Apr. 5, 2019, now Pat. No. 10,815,103.

(56) References Cited

U.S. PATENT DOCUMENTS

| | | |
|---|---|---|
| 4,624,446 A | 11/1986 | Gould |
| 4,765,792 A | 8/1988 | Cherry et al. |
| 5,106,246 A | 4/1992 | Chance |
| 5,381,575 A | 1/1995 | Silberman |
| 6,349,441 B1 | 2/2002 | Kosuch |
| 6,368,043 B1 | 4/2002 | Leum et al. |
| 7,073,777 B2 | 7/2006 | Branstetter |
| 7,316,043 B2 | 1/2008 | Henblad et al. |
| 7,533,431 B2 | 5/2009 | Hochstein et al. |
| 7,670,096 B2 | 3/2010 | Leum |
| D640,854 S | 6/2011 | Leum |
| 8,118,280 B2 | 2/2012 | Heinz |
| 9,162,831 B2 | 10/2015 | De Jong |
| 11,772,915 B2 * | 10/2023 | Leum .................. B65G 69/006 14/71.3 |
| 2016/0374876 A1 | 12/2016 | Thornton et al. |

* cited by examiner

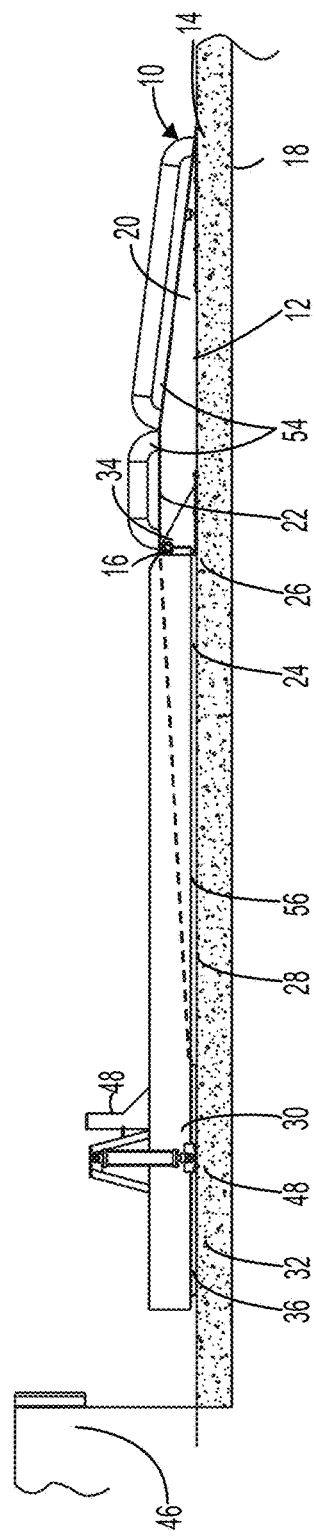
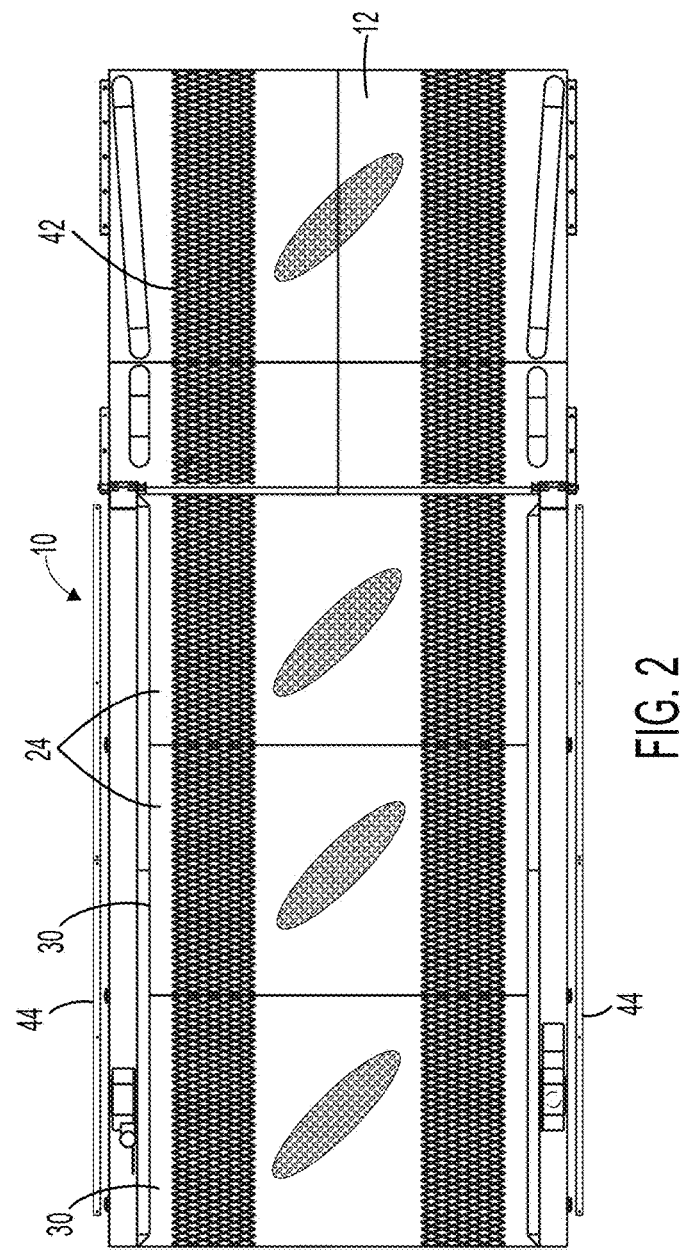

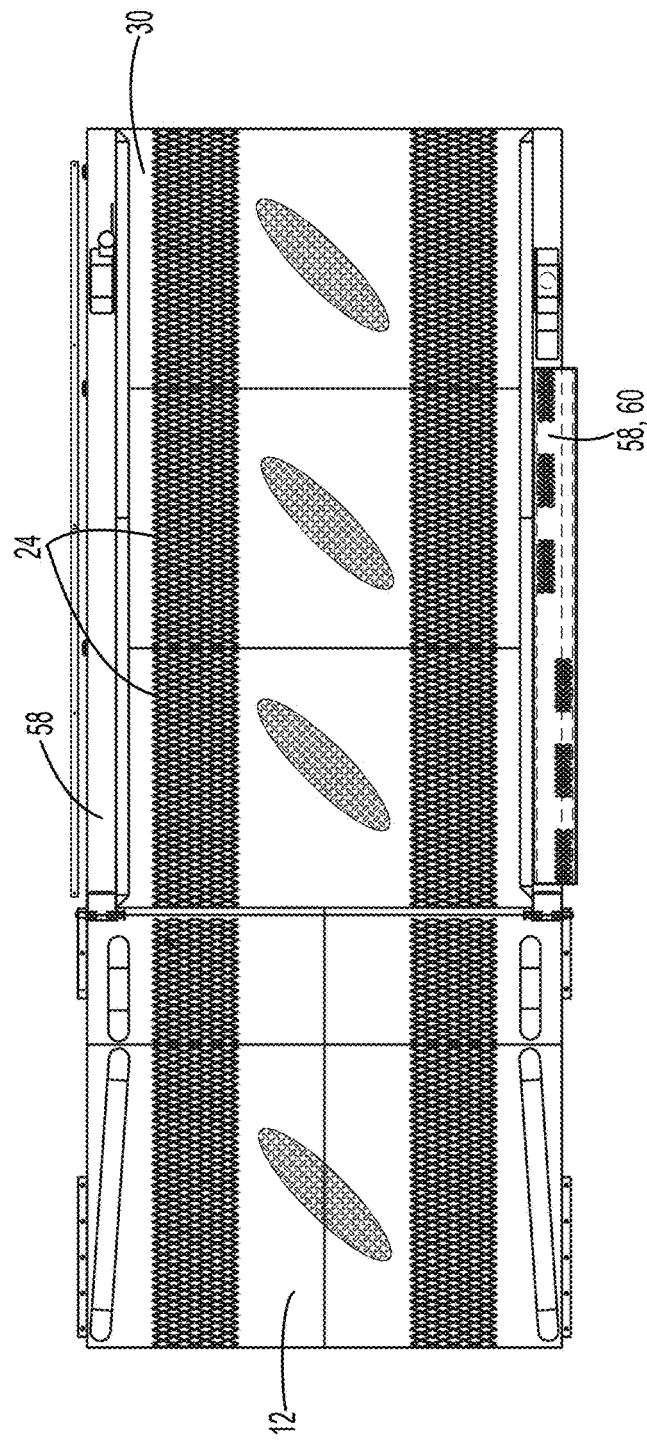
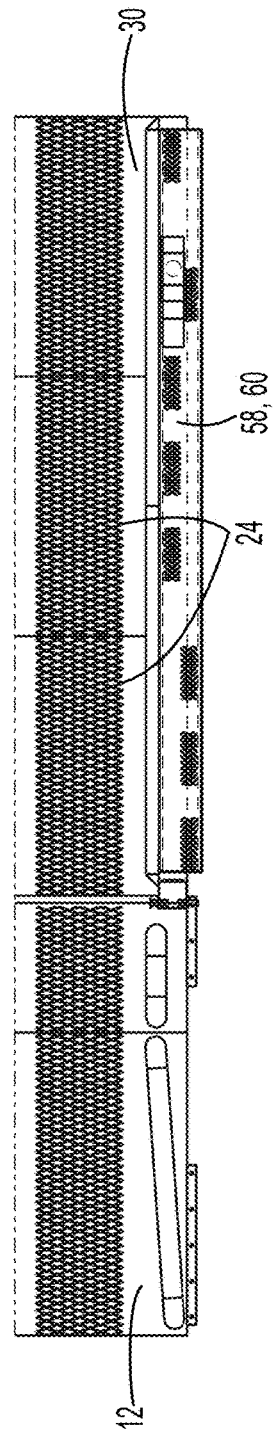
FIG. 9
FIG. 10

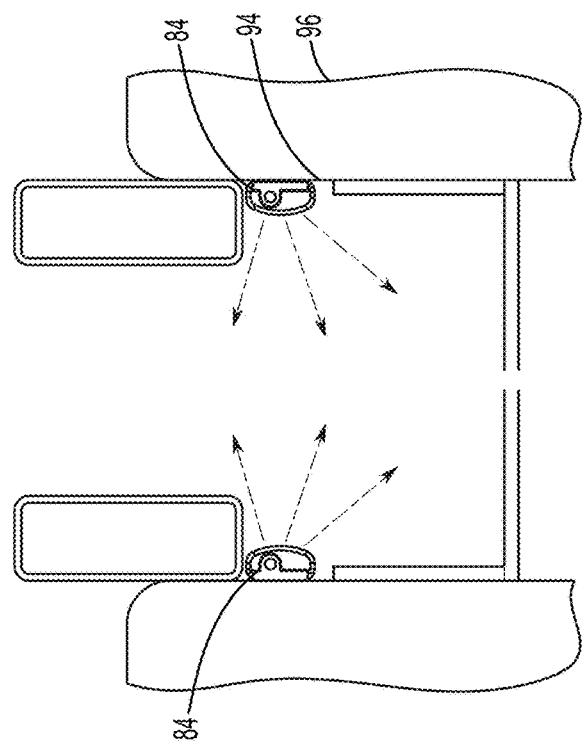
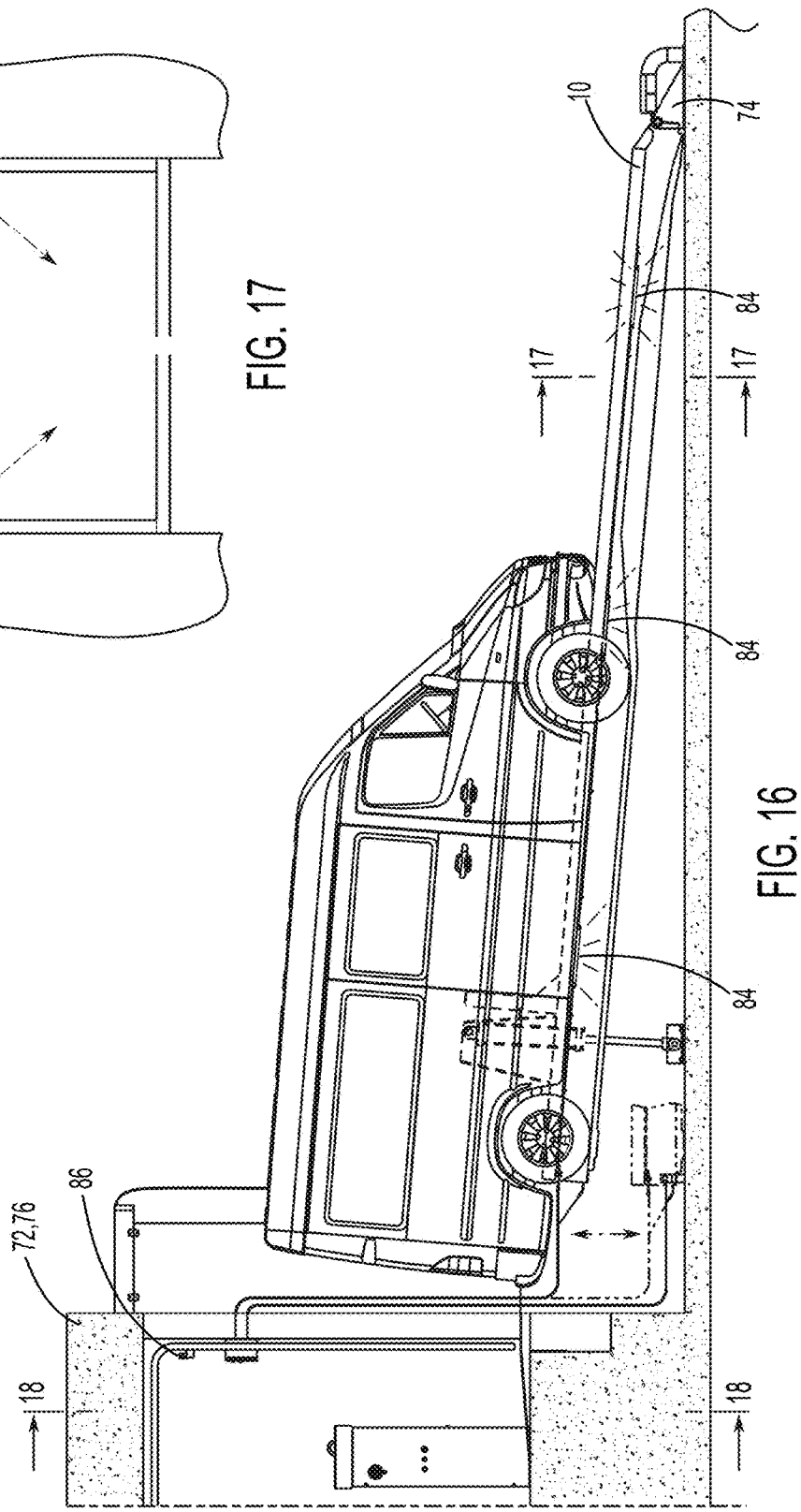

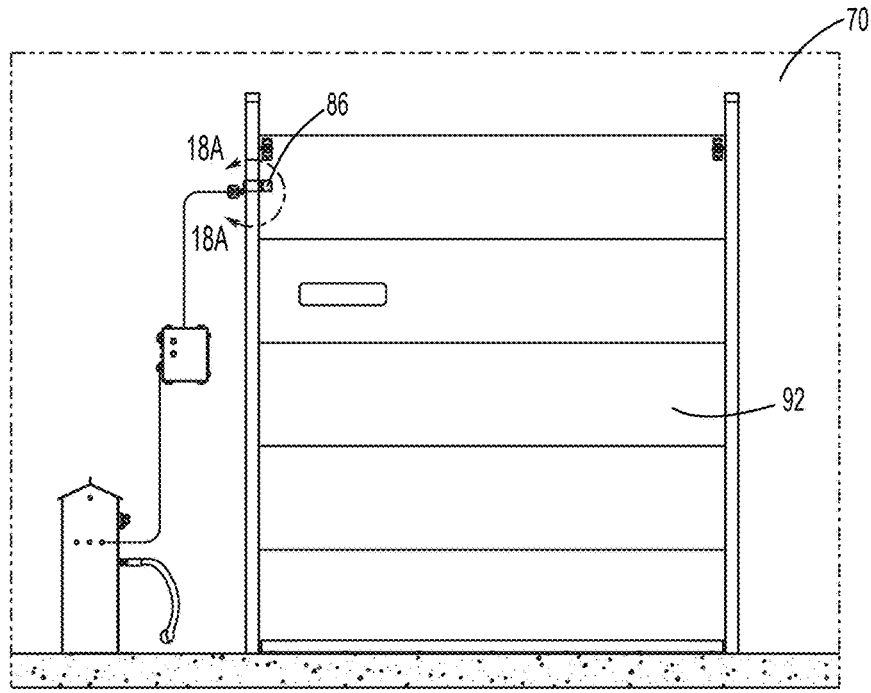
FIG. 18
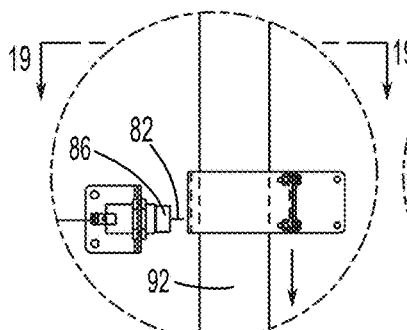
FIG. 18A
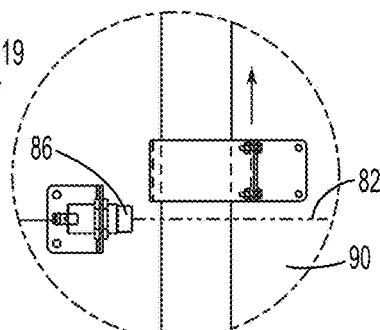
FIG. 18B
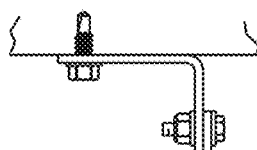
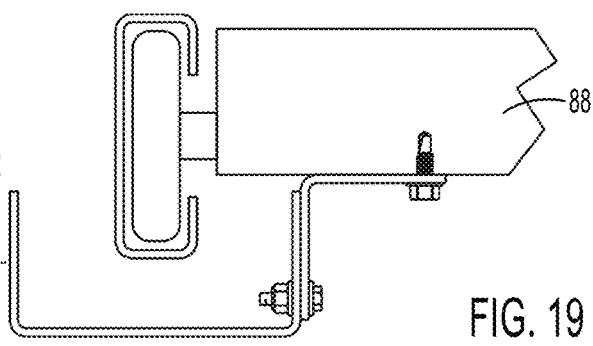
FIG. 19

VEHICLE LEVELER WITH LIGHTING SAFETY FEATURES

RELATED APPLICATION

This application is a continuation-in-part of patent application Ser. No. 17/550,870, filed on Dec. 14, 2021, which is a continuation-in-part of patent application Ser. No. 17/468,882, filed on Sep. 8, 2021, which is a continuation-in-part of patent application Ser. No. 17/355,160, filed on Jun. 22, 2021, which is a continuation-in-part of patent application Ser. No. 17/340,670, filed on Jun. 7, 2021, which is a continuation-in-part of patent application Ser. No. 17/322,889, filed on May 17, 2021, which is a continuation-in-part of patent application Ser. No. 17/174,301, filed on Feb. 11, 2021, which is a continuation-in-part of patent application Ser. No. 17/026,642, filed on Sep. 21, 2020, which is a continuation-in-part of patent application Ser. No. 16/376,910 filed on Apr. 5, 2019, issued on Oct. 27, 2020 as U.S. Pat. No. 10,815,103. Such prior applications are incorporated by reference herein in their entirety.

FIELD OF THE INVENTION

This invention relates to vehicle levelers and more particularly to a vehicle leveler having multiple surface angles as well as safety features, including an integrated lighting system.

BACKGROUND OF THE INVENTION

A variety of truck levelers have been devised to adjust the height of different trailers to properly match the deck of the trailer to the height of the dock. By aligning the height of the trailer and the dock the loading and unloading of cargo is facilitated.

One such device is seen in U.S. Pat. No. 4,624,446 to Gould which discloses a reinforced platform pivotally mounted to the ground at one end and includes a support assembly having hydraulic cylinders. In operation the rear wheels of a truck trailer are backed onto the platform and then the non-mounted end of the platform is lifted by the hydraulic cylinders until the deck of the trailer is equal to the height of the dock.

A similar device is shown in U.S. Pat. No. 4,765,792 to Cherry, et al. which also discloses a pivotally-mounted and hydraulically-raised platform. In addition to the disclosure of Gould, the device includes mounting the hydraulics inwardly from the non-mounted end of the platform and an aperture in the non-mounted end of the platform to accommodate a truck restraining device.

Another design is disclosed in U.S. Pat. No. 6,368,043 to Leum, et al. which teaches a low-profile truck leveler. In this design a low-profile leveler is enabled through the use of a raised rear beam and two lateral beams that extend above the upper surface of the platform. In addition, a central beam adds further to the strength and rigidity of the leveler.

Vehicle levelers of the prior art typically have certain disadvantages. The majority of vehicle levelers have ramp surfaces which are not highly adjustable. This is a distinct disadvantage when vehicles are being loaded or unloaded with cargo. Levelers of the prior art are also not able to accommodate all types of vehicles. This is yet another disadvantage.

Some levelers of the prior art have certain shortcomings and disadvantages to which this device is drawn. Specifically, it would be advantageous to have a vehicle leveler which is highly adjustable and can elevate both the rear and front axles of a vehicle at the same time so as to minimize the slope of the internal floor of the vehicle and thereby allow safer loading and unloading of cargo. It would also be advantageous to have a vehicle leveler which has enhanced safety features such as an adjacent elevated walkway for vehicle operators as well as integrated lights on the vehicle leveler.

In summary, there are problems and shortcomings in the prior art vehicle levelers and it is to these needs that this device is drawn.

OBJECTS OF THE INVENTION

It is an object of this invention to provide a vehicle leveler which is highly adjustable and can elevate both the rear and front axles of a vehicle at the same time so as to minimize the slope of the internal floor of the vehicle or trailer.

Another object of this invention is to provide a vehicle leveler which has improved safety during loading and unloading of cargo from a vehicle which is on the leveler.

Yet another object of this invention is to provide a safe walkway surface so as to give the vehicle driver a wide walk surface to assist them as they step into and out of a vehicle as well as when they walk around adjacent trailers.

Another object of this invention is to provide a safety light system which is integrated into the vehicle leveler and controlled by a sensor near the door.

These and other objects of the invention will be apparent from the following descriptions and from the drawings.

SUMMARY OF THE INVENTION

The preferred embodiment of the invention includes a vehicle leveler for use with a driveway which includes a first portion having a leading edge and a trailing edge. The trailing edge is disposed further from the driveway than the leading edge and forms a ramp section. The first portion has a flat section adjacent the trailing edge and the flat section is disposed about parallel with the substantially flat driveway. The second portion also includes an extension portion which extends from the trailing edge of the second portion toward the rear of the leveler and includes a substantially flat section disposed about parallel with the substantially flat driveway. The first portion and second portion are each unitary structures which are separate from each other until they are removably attached together by a connection apparatus. It is highly preferable that the vehicle leveler includes opposing side portions which extend the length of and contact the second portion and extension portion, the opposing side portions having a top surface which forms a walkway.

In highly preferred applications, two or more vehicle levelers can be installed adjacent to each other and an extended walkway surface can be removably installed between each vehicle leveler to form a large surface for a vehicle driver to use. It is preferable that the extended walkway surface and top surface form a large walkway for a vehicle driver. In some preferred embodiments each vehicle leveler has two, opposing top surfaces which each form a separate walkway. The walkway can extend the complete length of the top surface in some preferred embodiments or it can only extend a portion of the length of the top surface.

Preferably, the walkway and extended walkway surface include metal grating for a safe contact surface for a vehicle driver walking on the walkway or extended walkway surface.

The first portion and second portion are each preferably unitary structures which are separate from each other until they are removably attached together by a connection apparatus. It is highly preferred that the second portion including the extension portion can be moved between a lowered position and a raised position to accommodate varying dock heights for loading and unloading of cargo from vehicles. It is also preferable that the ramp section can be of varying lengths and heights to accommodate a single, rear axle vehicle as well as a large trailer.

Highly-preferred embodiments include at least one light on the opposing side portions. The at least one light is controlled by a sensor adjacent to a door and the sensor is preferably a proximity sensor.

Highly preferred embodiments also include that the door is a loading dock door and when the door is in an open position the at least one light is a first color and when the door is in a closed position the at least one light is a second, different color. Preferably, the sensor automatically changes the color of the at least one light between two different colors (which could be red or green or any other color) depending on if the door is in the open position or the closed position.

Preferably, the at least one light consists of multiple lights which are installed along a length of each opposing side portion. Each opposing side portion has an inside wall surface and an outside wall surface and preferably the multiple lights are installed along the inside wall surface. In other preferred embodiments, the at least one light is installed along the outside wall surface. It is preferable that multiple lights are installed along the outside wall surface. The at least one light along the outside wall surface is preferably a white light but can be any color light which illuminates the walkway for a user.

Highly-preferred embodiments include at least one light on the opposing side portions, the light(s) is controlled by at least one sensor which can sense when the vehicle leveler is in a lowered position and which changes the color of the light(s) when both the vehicle leveler is in a lowered position and the adjacent dock door is closed. Preferably, a proximity sensor senses both when the vehicle leveler is in the lowered position and the dock door is closed. Highly preferred embodiments include the at least one light being located on the inside surface of the opposing side portions and/or the at least one light being located on the outside surface of the opposing side portions.

BRIEF DESCRIPTION OF THE DRAWINGS

The drawings illustrate preferred embodiments including the above-noted characteristics and features of the device. The device will be readily understood from the descriptions and drawings. In the drawings:

FIG. 1 is a perspective view of the vehicle leveler;

FIG. 2 is a top view of the vehicle leveler in FIG. 1;

FIG. 9 is a top view of the vehicle leveler illustrating the top surface/walkway extending partially along the length of the leveler;

FIG. 10 is a top view of the vehicle leveler illustrating the top surface/walkway extending farther along the length of the leveler;

FIG. 16 is a perspective view of the vehicle leveler in the raised position;

FIG. 17 is a cutaway view taken along line 17-17 of FIG. 16;

FIG. 18 is a cutaway view taken along line 18-18 of FIG. 16;

FIG. 18A is an enlarged view taken along line 18A-18A of FIG. 18 showing the sensor being blocked;

FIG. 18B is an enlarged view taken along line 18A-18A of FIG. 18 showing the sensor not being blocked;

FIG. 19 is a perspective view showing the sensor being blocked by the door;

DETAILED DESCRIPTION OF PREFERRED EMBODIMENTS

Figure 3:
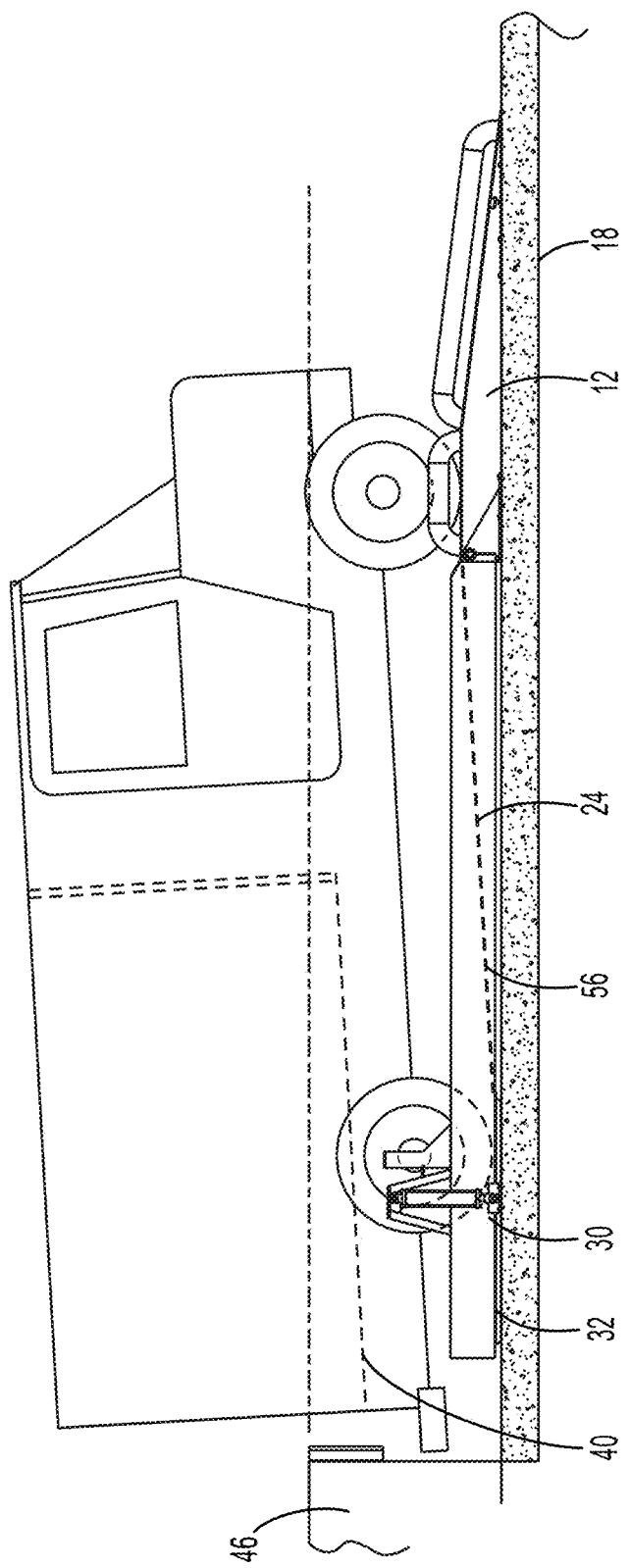
FIG. 3 is a perspective view of the vehicle leveler of FIG. 1 with a truck on the leveler and the leveler in the lowered position.

A preferred embodiment of the present invention is shown in FIGS. 1-24. Vehicle leveler 10, as shown in FIG. 1, includes three primary portions; a first portion 12, a second portion 24 and an extension portion 30 and is designed to be utilized in conjunction with a substantially flat driveway 18 near a loading dock wall 46. Furthermore, leveler 10 can be moved between a lowered position 36, shown in FIGS. 1 and 3 and a raised position 38, shown in FIGS. 4-6.

First portion 12 has a ramp section 20 which is inclined upwards and a flat section 22 adjacent ramp section 20. First portion 12 includes a leading edge 14 and a trailing edge 16. Trailing edge 16 is disposed further from driveway 18 than leading edge 14. Trailing edge 16 is part of flat section 22. Flat section 22 is disposed about parallel with substantially flat driveway 18.

Figure 4:
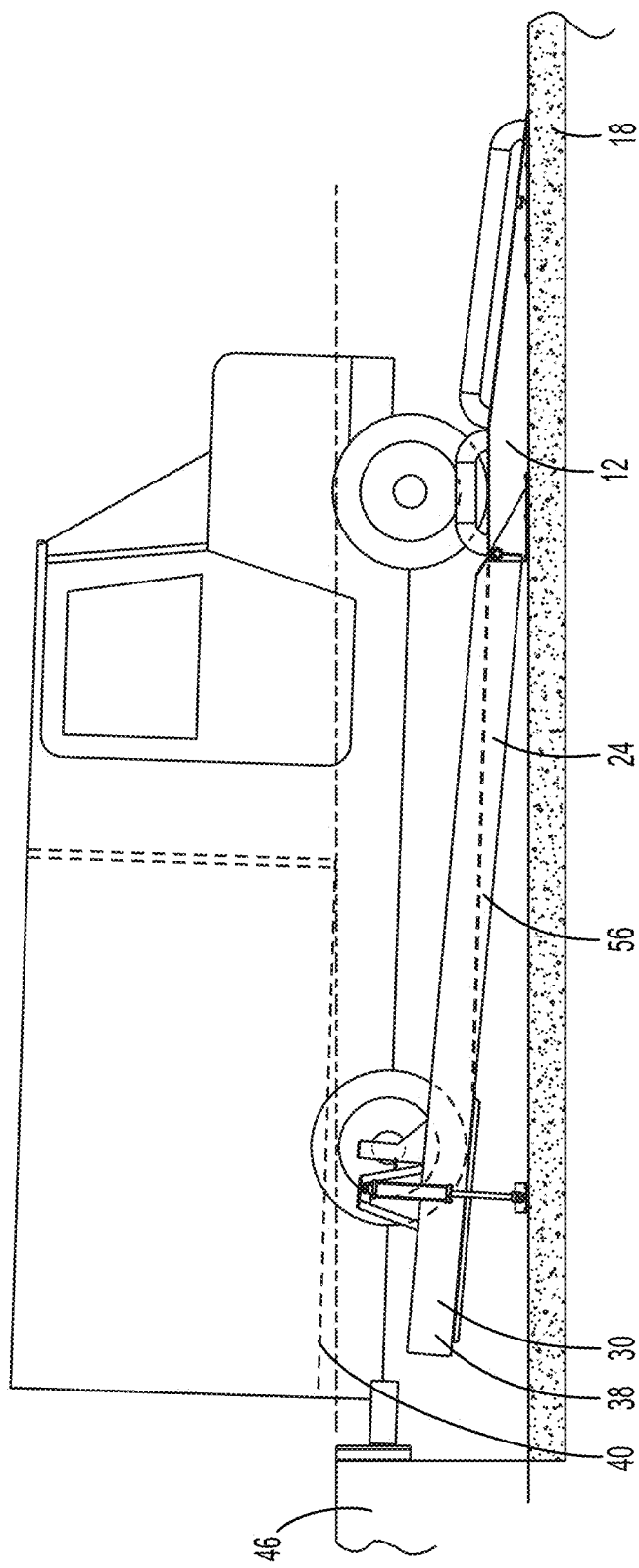
FIG. 4 is a perspective view of the vehicle leveler of FIG. 1 with a truck on the leveler and the leveler in the raised position.
Figure 5:
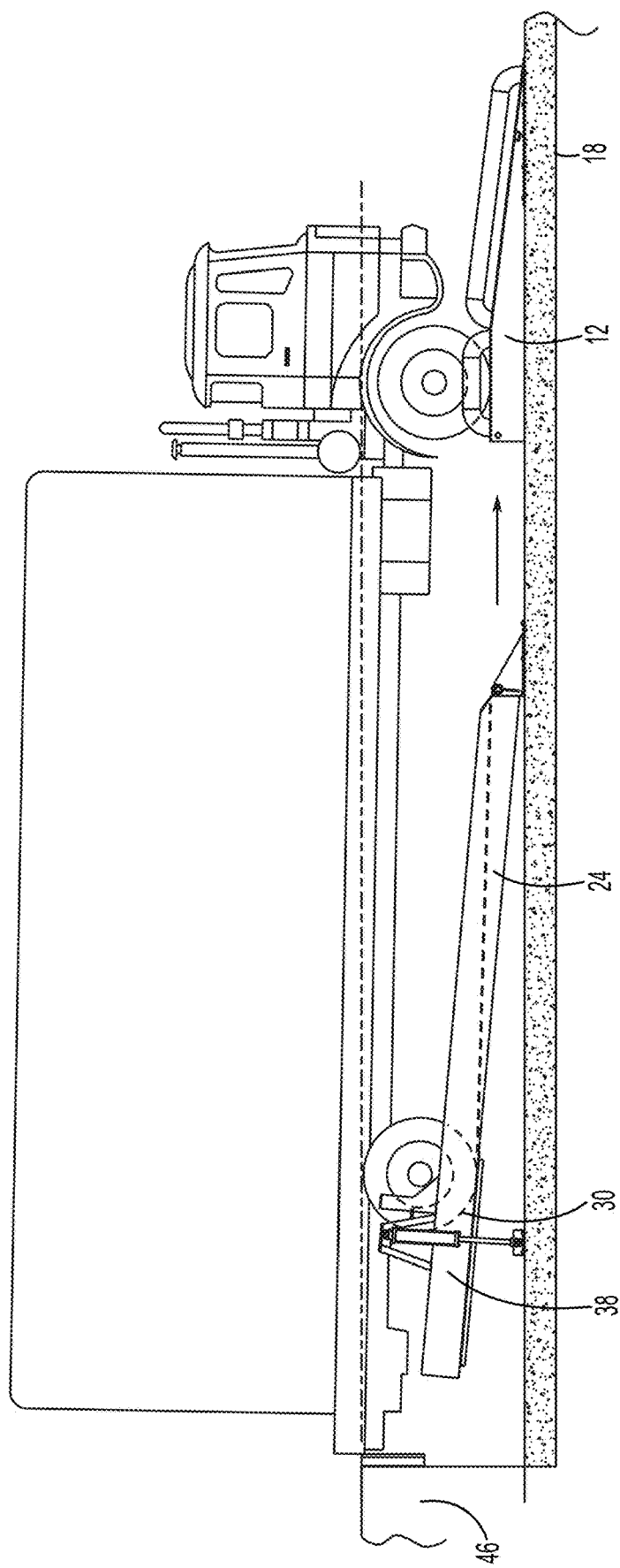
FIGS. 5-6 are perspective views of the vehicle leveler in the raised position.

FIG. 1 illustrates that second portion 24 has a leading edge 26 and a trailing edge 28. Leading edge 26 of second portion 24 is removably attached to trailing edge 16 of first portion 12 as seen in FIGS. 1, 3-4. FIG. 5 illustrates that first portion 12 and second portion 24 are removably attached as it shows first and second portions 12, 24 separated. Leading edge 26 of second portion 24 is disposed further from driveway 18 than trailing edge 28 of second portion 24.

Second portion 24 also includes an extension portion 30 as can be seen in FIGS. 1-7. Extension portion 30 extends from trailing edge 28 of second portion 24 toward a rear of leveler 10 (nearest loading dock wall 46) and includes a substantially flat section 32 disposed about parallel with substantially flat driveway 18.

FIG. 2 illustrates that first portion 12 and second portion 24 include metal grating 42 over a steel plate for contact with wheels of a vehicle as the vehicle moves onto and off of leveler 10. Metal grating 42 over a steel plate is a material which is both durable and also provides increased traction for vehicles when moving onto or off of leveler 10.

FIGS. 1-7 illustrate that first portion 12 and second portion 24 are each unitary structures which are separate from each other as seen in FIG. 5 until they are removably attached together by a connection apparatus 34 as seen best in FIGS. 1 and 3-4. Connection apparatus 34 is located on leading edge 26 of second portion 24 and connects to trailing edge 16 of first portion 12. Flat section 22 of first portion 12 is in front of connection apparatus 34 since connection apparatus 34 is located on leading edge 26 of second portion 24.

Figure 6:
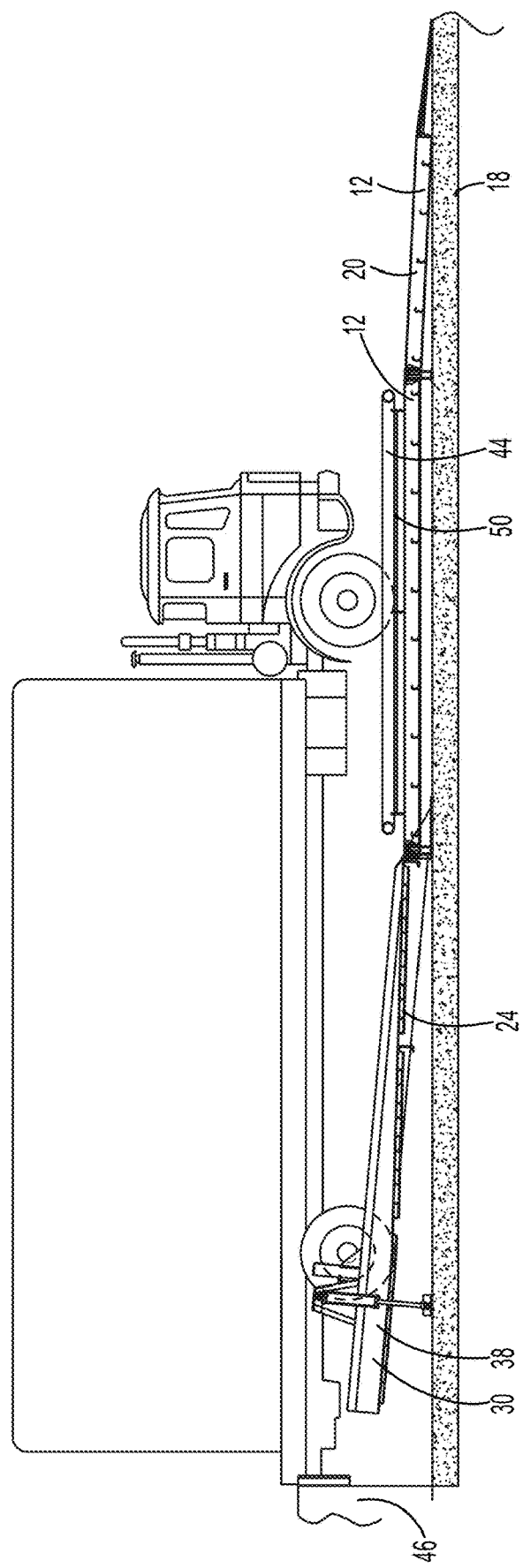
Figure 7:
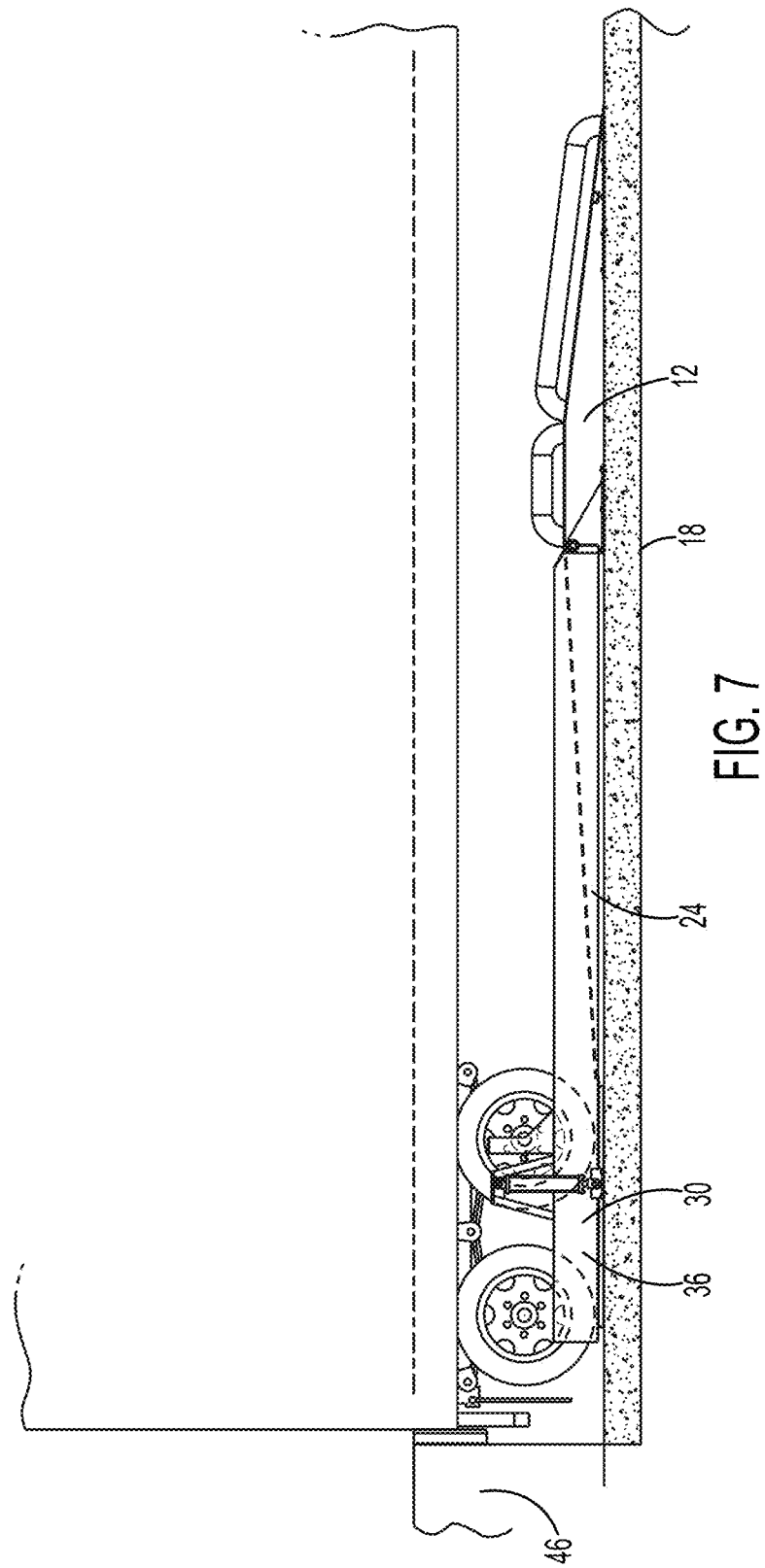
FIG. 7 is a perspective view of the vehicle leveler of FIG. 1 in the lowered position with a trailer on the leveler.

The drawings illustrate that second portion 24 including extension portion 30 can be moved between a lowered position 36 as seen in FIGS. 1, 3 and 7 and a raised position 38 as seen in FIGS. 4-6, to accommodate varying dock heights for loading and unloading of cargo from vehicles. FIGS. 4-7 show a variety of different types of vehicles which can utilize leveler 10.

Depending on the length of the vehicle, leveler 10 can be customized in a variety of ways including that extension portion 30 can consist of multiple extension portions which are identical and which are removably attached together so as to accommodate a vehicle which has a longer length. FIG. 2 illustrates a leveler 10 with more than one extension portion 30. In an embodiment with multiple extension portions 30, each extension portion 30 is removably secured to another extension portion 30. In this type of embodiment, a first extension portion 30 would extend from trailing edge 28 of second portion 24 toward a rear of leveler 10, and extension portions 30 each would include a substantially flat section 32 disposed about parallel with substantially flat driveway 18. In some embodiments, the multiple extension portions 30 can be of varying lengths and do not have to be identical in length.

Leveler 10 can be manufactured so that ramp section 20 can be of varying lengths and heights to accommodate a single, rear axle vehicle as well as a large trailer. FIGS. 1 and 6 each illustrate a ramp section 20 with a different length and height. Ramp section 20 and flat section 22 can be manufactured with different lengths and heights to accommodate single rear axle vans and trailers as well as 53-foot over the road tractor trailers. Therefore, leveler 10 can be manufactured so that any of first portion 12, second portion 24 or extension portion 30, can be of varying lengths and heights so as to accommodate a variety of vehicles types and sizes. For example, FIGS. 3-4 show a box-type truck on leveler 10, FIGS. 5-6 show a larger vehicle on leveler 10 and FIG. 7 illustrates a very large trailer on leveler 10. With leveler 10 it is possible that both the front and rear axles of a vehicle can be elevated to minimize the incline or decline of an inside floor surface 40 of a trailer or vehicle, thereby making loading and unloading of cargo safer. FIGS. 3-7 illustrate a variety of vehicles on leveler 10 and the dotted line in FIGS. 3-4 illustrates inside floor surface 40 of the vehicle. FIGS. 4-6 illustrate vehicles on leveler 10 that have both a front and rear axle elevated.

FIG. 6 illustrates that leveler 10 can include opposed sidewalls 52 (see FIG. 2) with a light-mounting channel 44 having at least one light 50 (which could be a single light, multiple lights or a rope light) integrated into light-mounting channel 44. Light(s) 50 assist vehicles, such as trailers, when they are backing in or pulling away from leveler 10.

A lifting system is also incorporated into leveler 10 in the form of hydraulic lifts 48 which contact driveway 18 as seen in FIG. 1. Hydraulic lifts 48 lift second portion 24 including extension portion 30 of leveler 10. However, any other lifting systems known in the art could be utilized as well.

Leveler 10 may also include wheel guides 54 shown in FIG. 1 which can be on any or all of first portion 12, second portion 24 or extension portion 30. FIG. 1 illustrates wheel guides 54 on first portion 12. Wheel guides 54 act to guide the wheels of the trailer into the proper position for loading and unloading of cargo.

The relationship between first portion 12 and driveway 18 as well as second portion 24 and driveway 18 can also be defined in terms of angles as shown in FIGS. 1-7. Ramp section 20 of first portion 12 is inclined from driveway 18 about 1-15 degrees from parallel with driveway 18. Second portion 24 extending from first portion 12 toward a rear of leveler 10 includes a decline section 56 which declines toward substantially flat driveway 18 at between about 1-15 degrees from parallel with substantially flat driveway 18.

In operation, a vehicle (including sometimes a large trailer) is backed up to leveler 10 to put the rear wheels onto first portion 12, specifically ramp section 20. The wheels and trailer are therefore elevated from driveway 18 as they are backed up onto ramp section 20. As the vehicle is further backed onto leveler 10 the rear wheels pass onto second portion 24 or decline section 56 and begin to be lowered back toward driveway 18. As the rear wheels continue to be backed up, they contact extension portion 30 and at this point, depending on the length and size of the trailer or vehicle, the rear of the trailer or vehicle may now be in contact with loading dock wall 46. Depending on the length of the vehicle or trailer, the front wheels may either be in contact with first portion 12 as can be seen in FIGS. 3-4 or the trailer may be so large that only the back wheels are on leveler 10 as seen in FIG. 7. Once though the rear wheels are backed up as far onto leveler 10 as they can go, the lifting system can then be operated to lift the trailer to the proper height to safely load and unload cargo. Leveler 10 can elevate both the front and rear wheels of a vehicle to minimize the slope of the internal floor of the vehicle which allows for safer loading and unloading.

FIGS. 8-14 illustrate that vehicle leveler 10 includes opposing side portions 58 which extend the length of and contact first portion 12, second portion 24 and extension portion 30.

Figure 8:
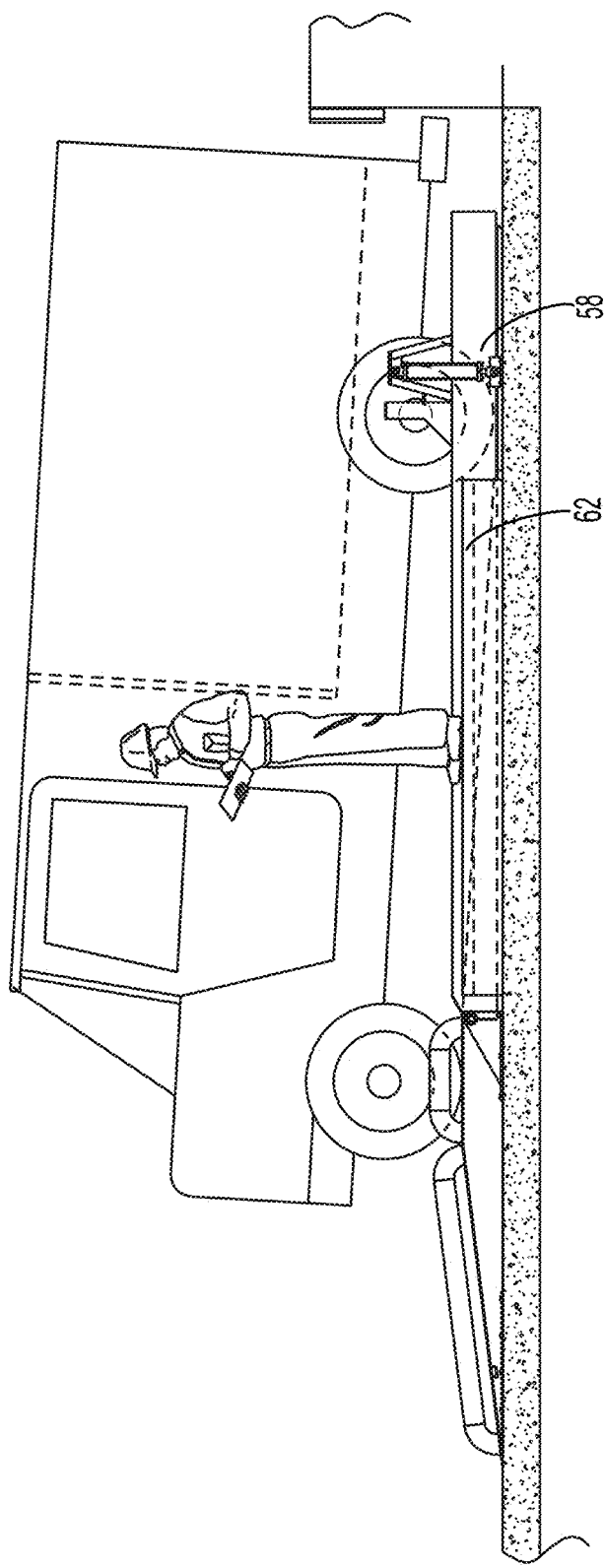
FIG. 8 is a perspective view of the vehicle leveler of FIG. 1 with a vehicle driver using the top surface/walkway.

As seen best in FIGS. 9-10, opposing side portions 58 have a top surface 60 which forms a walkway 60. The walkway, also referred to herein as top surface 60, is a safety feature which is used by a driver when he enters or exits a vehicle which is using vehicle leveler 10. FIG. 8 illustrates a driver using walkway 60. FIG. 10 illustrates that top surface/walkway 60 can extend the complete length of second portion 24 and extension portion 30, whereas FIG. 9, illustrates that top surface/walkway 60 can only extend a portion of the length of second portion 24 and extension portion 30.

Figure 12:
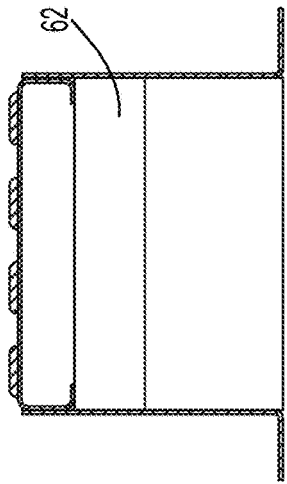
FIG. 12 is a front view of the extended walkway surface.
Figure 11:
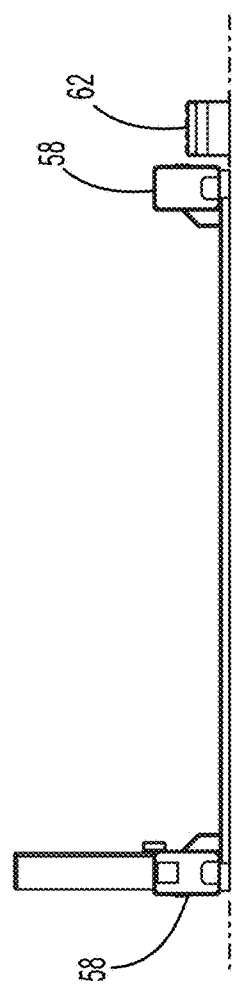
FIG. 11 is a front view of the leveler illustrating the opposing side portions and extended walkway surface.
Figure 13:
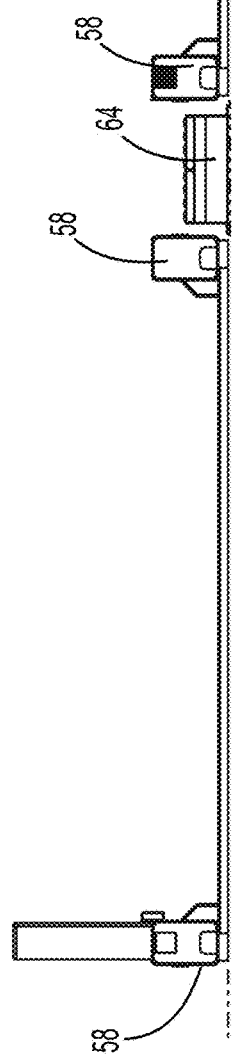
FIG. 13 is a front view of two levelers installed side-by-side and illustrating the large walkway.
Figure 14:
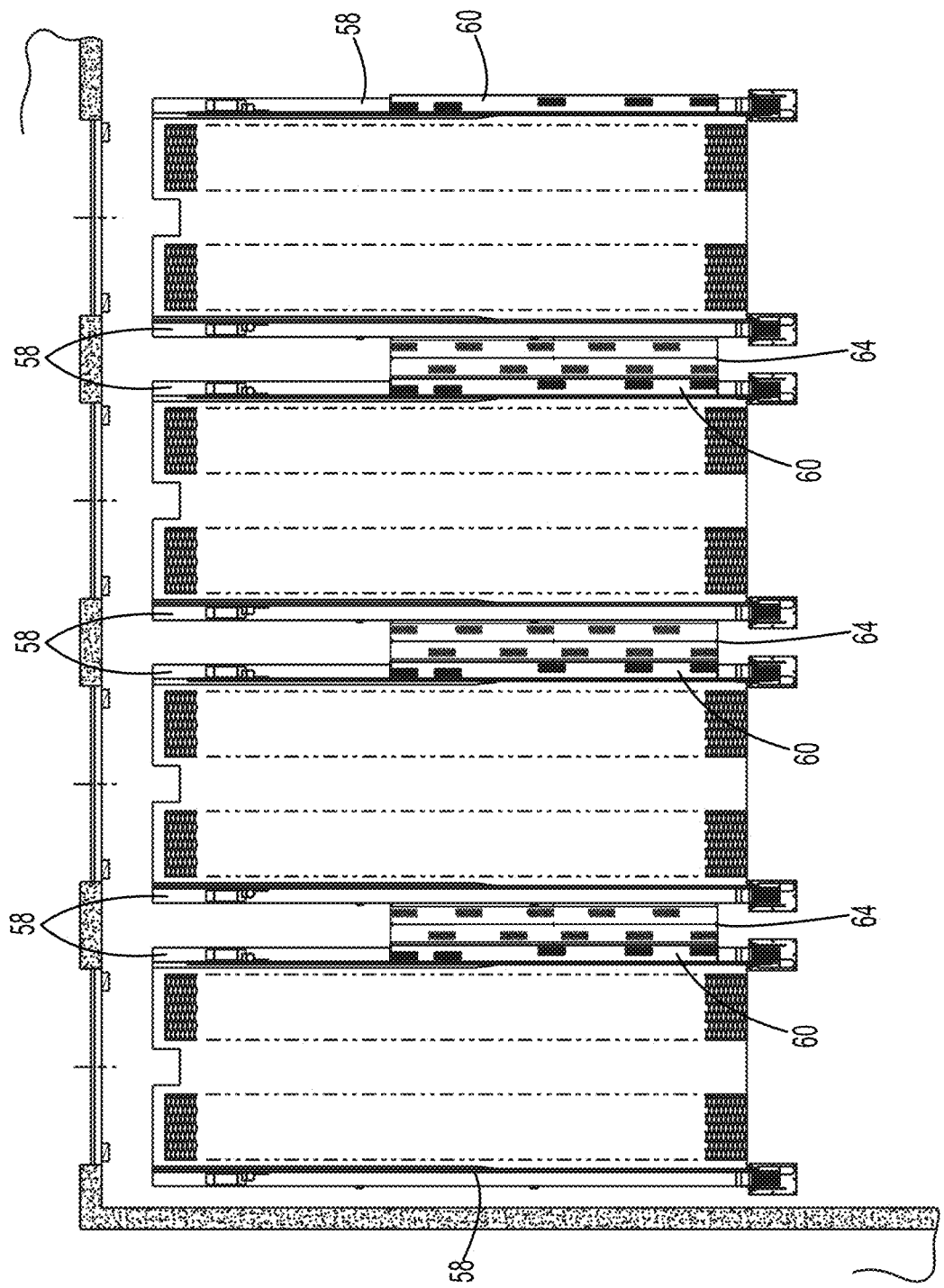
FIG. 14 is a top view illustrating four vehicle levelers installed adjacent to each other with a large walkway in between the levelers.

FIG. 11 illustrates opposing side portions 58 as well as top surface/walkway 60. FIG. 12 is a more detailed view of just the extended walkway surface 62 which is mounted between two vehicle levelers 10 to form a large walkway 64. FIGS. 13-14 illustrate that two or more vehicle levelers 10 can be installed adjacent to each other and extended walkway surface 62 can be removably installed between each vehicle leveler 10 to form a large walkway 64 for a vehicle driver to use. In FIG. 14, each vehicle leveler 10 has two, opposing side portions 58 with top surfaces 60 which each form a separate walkway. FIG. 14 illustrates four vehicle levelers 10 installed adjacent to each other.

FIG. 14 also illustrates that extended walkway surface 62 which forms large walkway 64 is a step (two or more walkway surfaces 62 can be put together to make large walkway 64 or walkway surface 62 can be manufactured to be wider and can be large walkway 64) which is wide so as to give the vehicle driver a wider walk surface to assist them as they step onto that and walk out to get around adjacent trailers.

Figure 15:
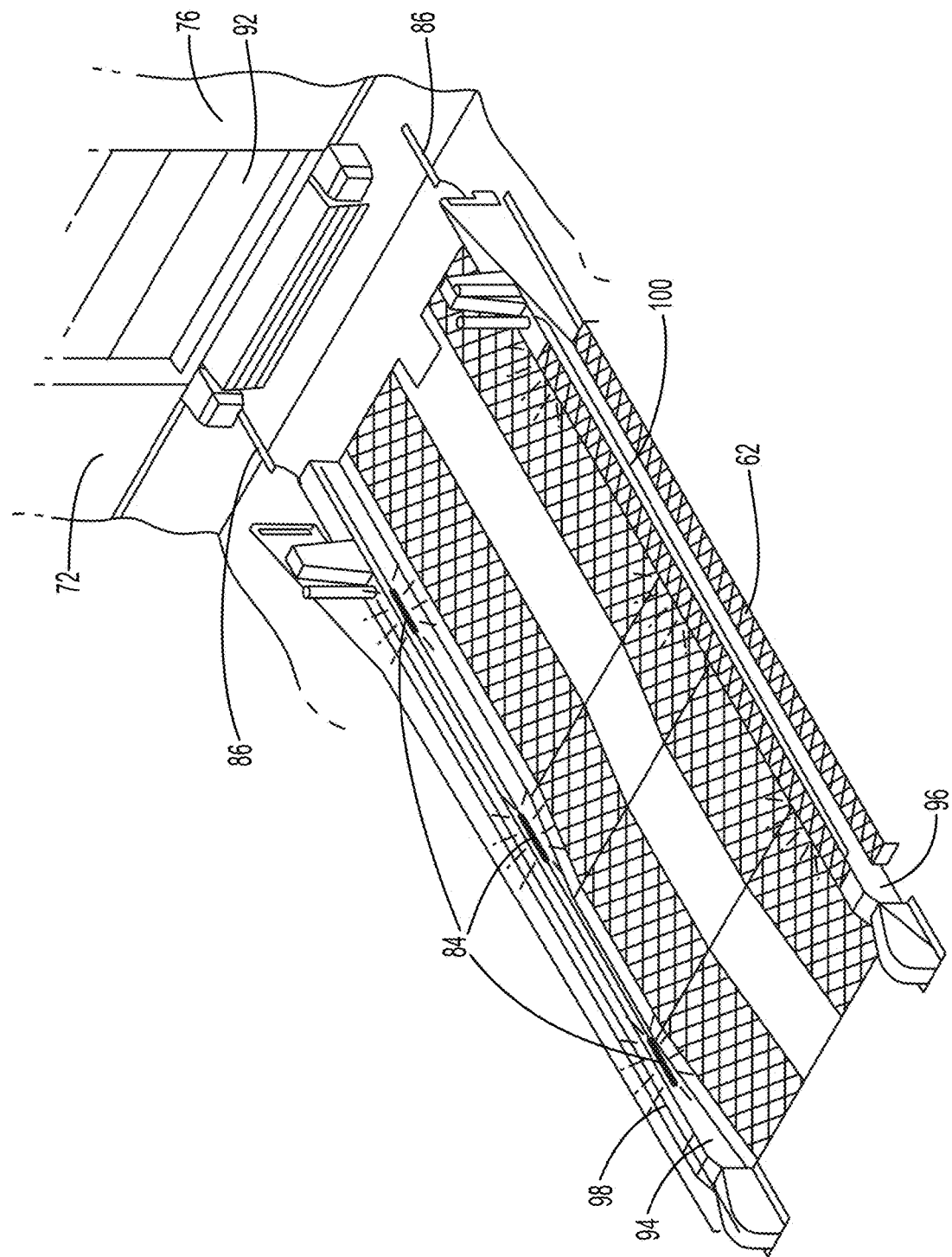
FIG. 15 is a perspective view of the vehicle leveler in the lowered position.

FIGS. 15-19 illustrate that vehicle leveler 10 works with a door interlock system which has at least one pair of photoelectric sensors 86 with a sensor path 82. FIGS. 15-16 illustrate there is at least one light 84 on opposing side portions 58 and that at least one light 84 is controlled by a sensor 86 adjacent to a loading dock door 88. Sensor 86 is a proximity sensor and is typically multiple sensors.

When door 88 is in an open position 90 as seen in FIG. 16, at least one light but preferably multiple lights 84 are a first color. When door 88 is in a closed position 92 as seen in FIG. 15 at least one light but preferably multiple lights 84 are a different second color. Sensor 86 will automatically change the color of at least one light 84 between the first and second colors depending on if door 88 is in open position 90 or closed position 92.

In certain embodiments, at least one light 84 are multiple lights installed along a length of each opposing side portion 58. Each opposing side portion 58 has an inside wall surface 94 and an outside wall surface 96 as can be best seen in FIGS. 15 and 23-24. Multiple lights 84 installed along inside wall surface can also be seen in FIGS. 15-16.

Figure 23:
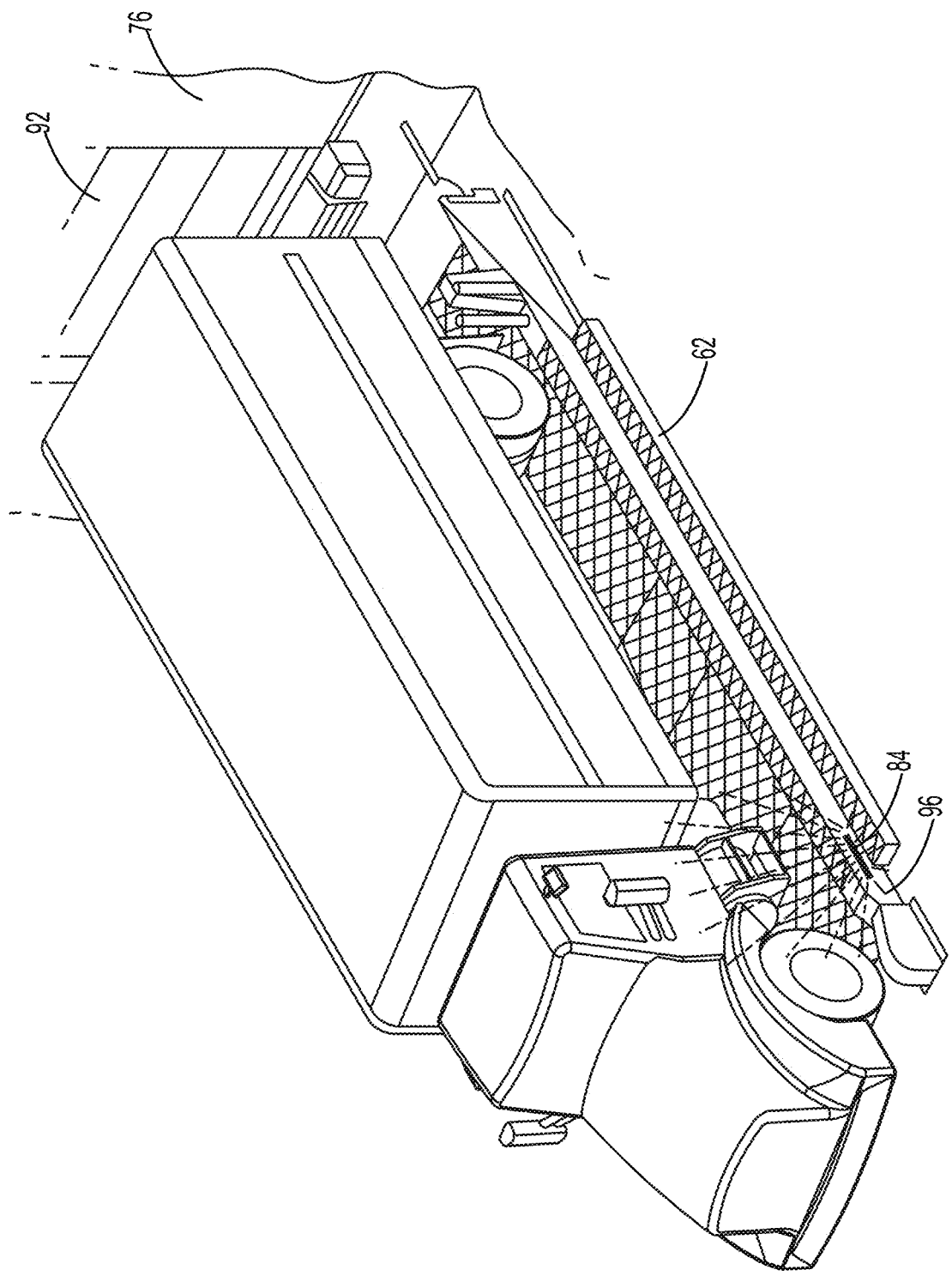
FIG. 23 is a perspective view of the vehicle leveler illustrating the light.
Figure 24:
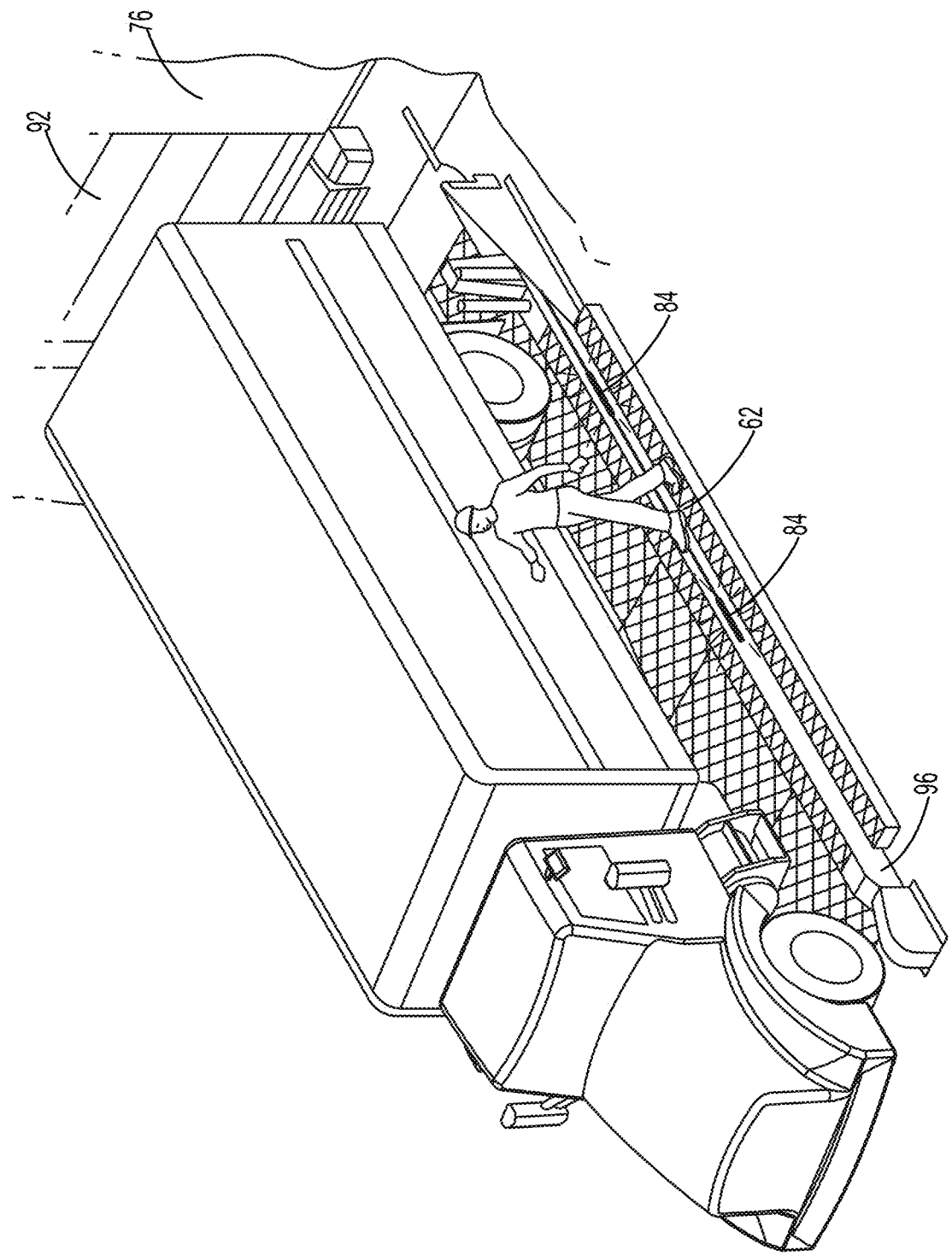
FIG. 24 is another perspective view of the vehicle leveler illustrating more than one light.

FIG. 15 illustrates that at least one light 100 is installed along outside wall surface 96. One light 100 on outside wall surface 96 is a white light (or can be an alternative color as well) which illuminates walkway 62 for a user. FIGS. 23-24 illustrate that one or more lights 84 can be installed on the outside surface 96 of the opposing side portions 58 which illuminates walkway 62. One or more lights 84 increase safety as it is easier for vehicle drivers to see when it is dark where they are walking on walkway 62.

Multiple sets of photoelectric sensors 86 can be used and placed at varying locations adjacent vehicle leveler 10. Photoelectric sensors 86 are mounted onto a building wall 76 as seen in FIGS. 16 and 18, although they can also be mounted in any place in which a photoelectric sensor could be used. For example, FIG. 15 illustrates that photoelectric sensors 86 can be placed adjacent ramp section 20 of vehicle leveler 10.

Photoelectric sensors 86 can operate independently of the power supply for the vehicle leveler, which allows photoelectric sensors 86 the ability to stop the lowering or raising of vehicle leveler 10 by stopping a supply of power to a motor.

Figure 22:
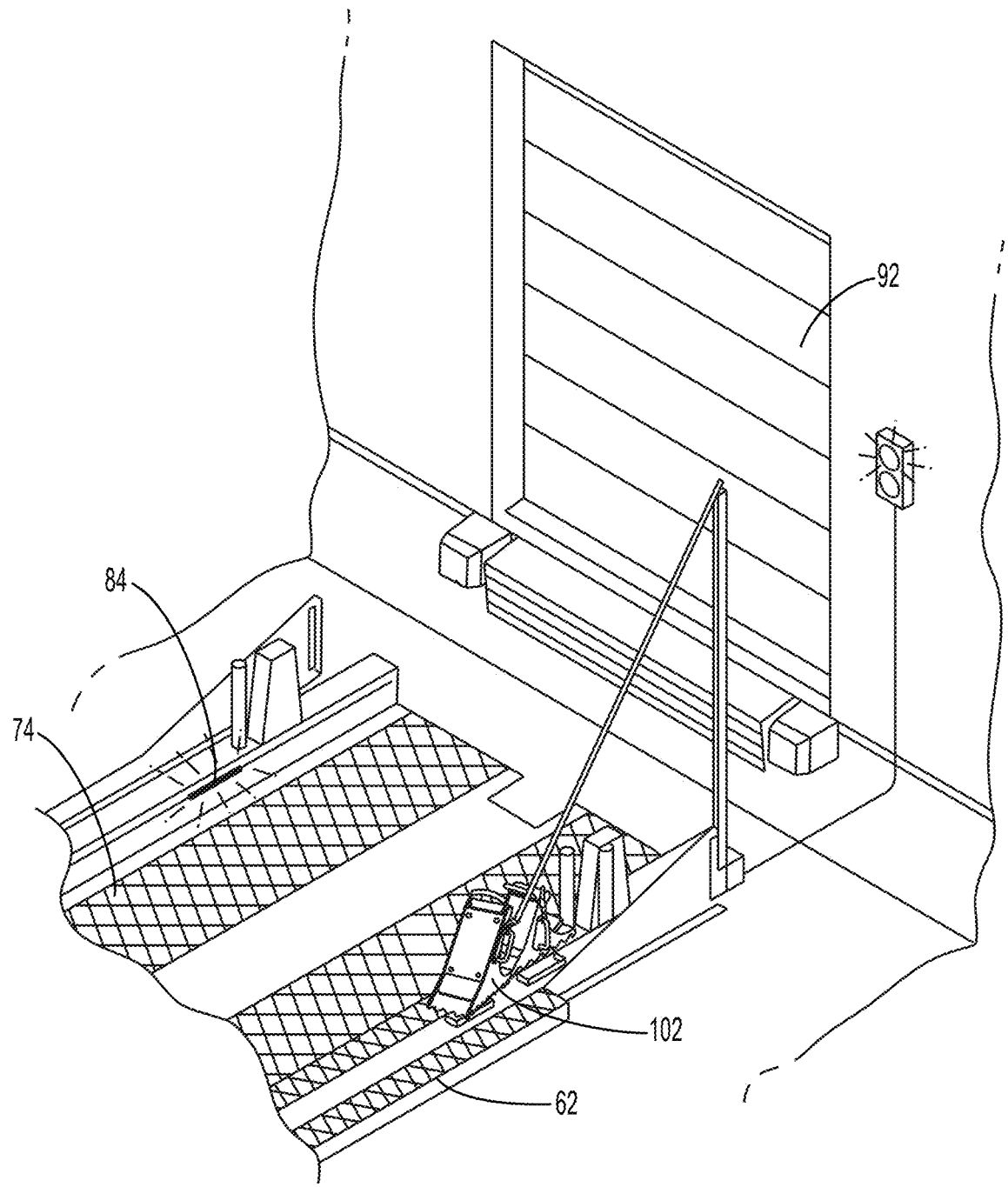
FIG. 22 is a perspective view of the vehicle leveler illustrating the wheel chock.

A powered wheel chock 102 which has sensors to identify when wheel chock 102 is in place against the wheel of a vehicle is also included and shown in FIG. 22. The sensors (as seen in FIGS. 16 and 18) associated with wheel chock 102 automatically change the outside light on a building wall to red (or any other color) and a light on the inside of a building on a building wall to green (or any other color). The lights on the outside which are associated with wheel chock 102 are interconnected so that the wall light associated with wheel chock 102 is the same as the at least one light 84 on opposing side portions 58. Output from wheel chock 102 and the position of wheel chock 102 can change the color of the lights.

Figure 20A:
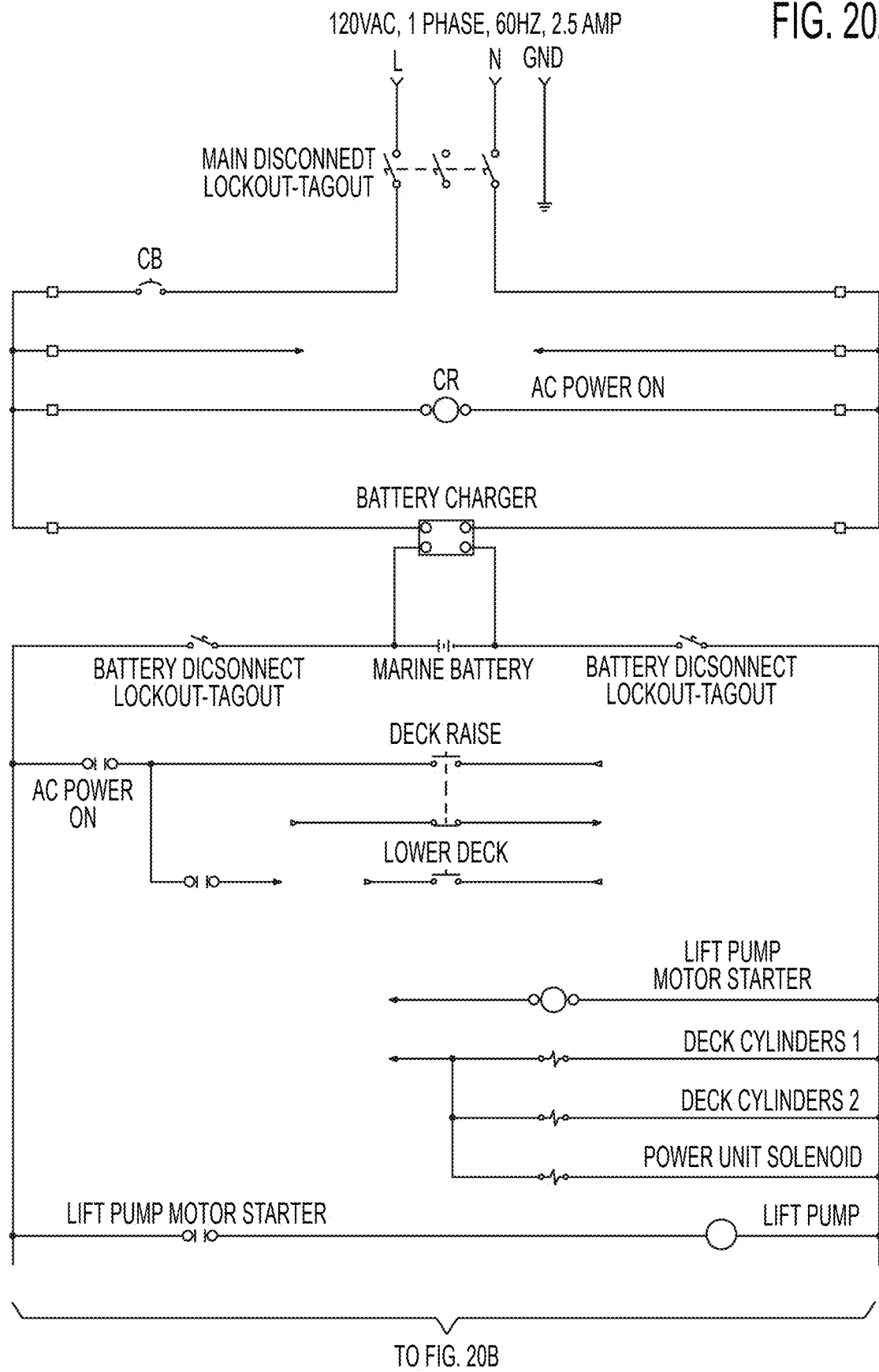
FIG. 20A and FIG. 20B are electrical schematics for the control box.
Figure 20B:
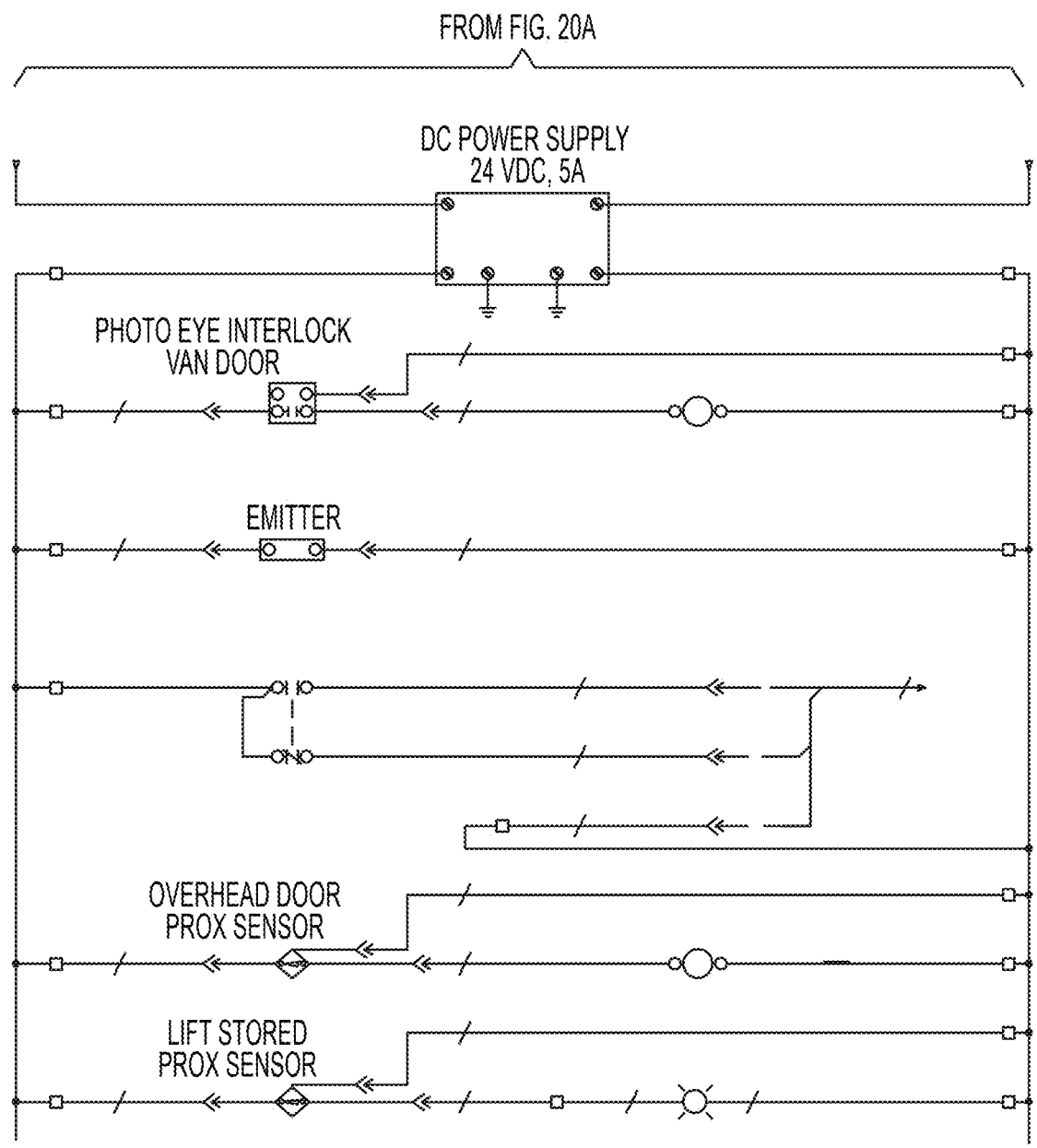
Figure 21:
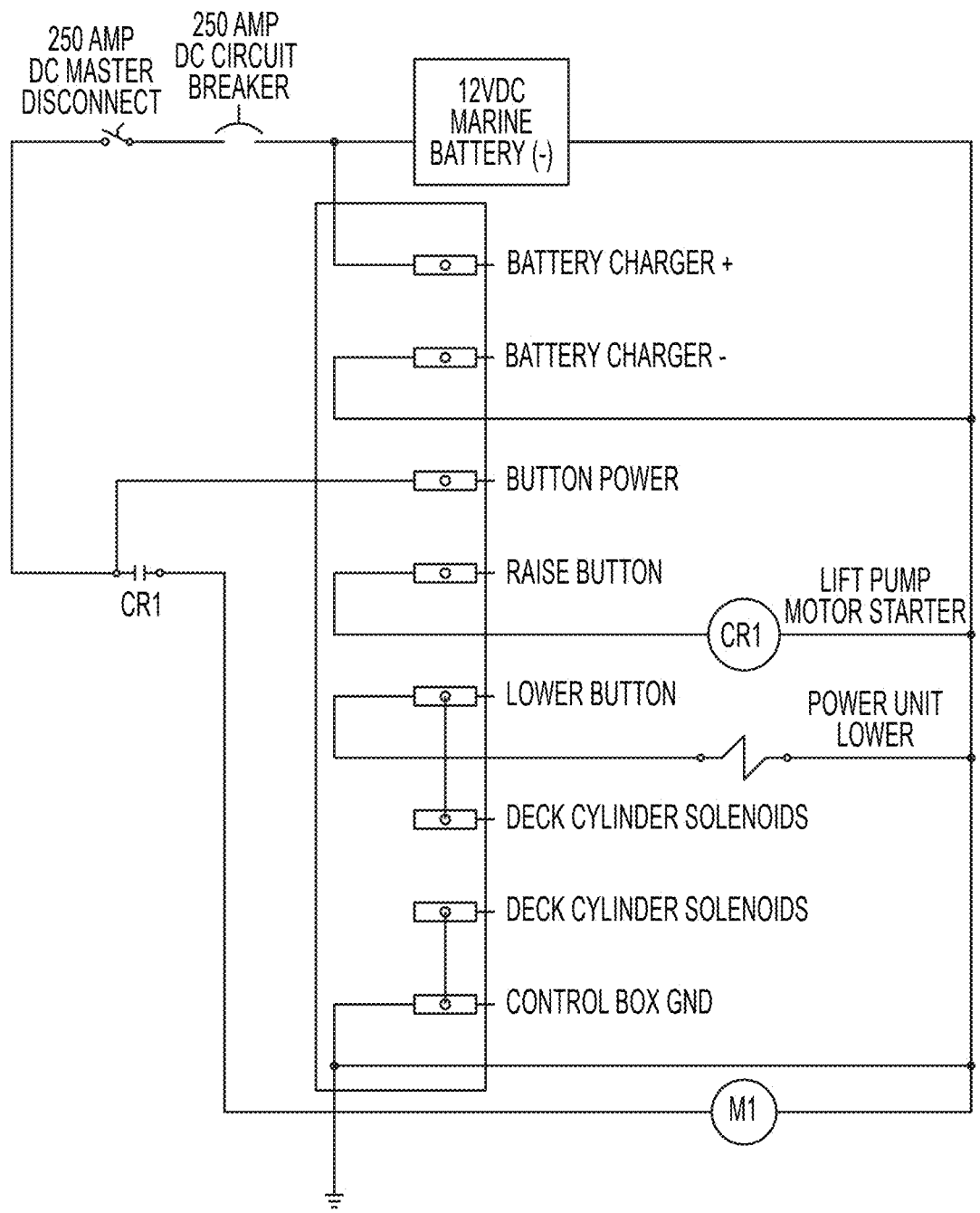
FIG. 21 is an electrical schematic for the power unit.

FIGS. 20A and 20B are an electrical schematic for the control box. FIG. 21 is an electrical schematic for a power supply in the power unit enclosure which houses a battery.

The power supply has a current draw which is lower than a current draw from a power supply unit with an AC motor. The battery powers a 12 volt direct current power system which requires a large amount of power for a short period of time. The battery can be charged over a period of time with a lower power requirement from the building, thereby allowing use of a 120 volt 15 amp circuit to power a dock door.

A wide variety of materials are available for the various parts discussed and illustrated herein. Although the device has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A vehicle leveler for use with a driveway comprising:
a first portion having a leading edge and a trailing edge wherein the trailing edge is disposed further from the driveway than the leading edge and forms a ramp section, the first portion having a flat section adjacent the trailing edge, the flat section being disposed about parallel with the substantially flat driveway;
a second portion having a leading edge and a trailing edge wherein the leading edge of the second portion is removably attached to the trailing edge of the first portion and the leading edge of the second portion is disposed further from the driveway than the trailing edge of the second portion, the second portion also including an extension portion which extends from the trailing edge of the second portion toward a rear of the leveler and includes a substantially flat section disposed about parallel with the substantially flat driveway;
opposing side portions which extend the length of and contact the first portion, second portion and extension portion, the opposing side portions having an inside surface, an outside surface and a top surface, the top surface forming a walkway; and
at least one light on the opposing side portions, the at least one light being controlled by a sensor adjacent to a door.

2. The vehicle leveler of claim 1 wherein the at least one light is located on the inside surface of the opposing side portions.

3. The vehicle leveler of claim 1 wherein the at least one light is located on the outside surface of the opposing side portions.

4. The vehicle leveler of claim 1 wherein the sensor is a proximity sensor.

5. The vehicle leveler of claim 1 wherein the door is a loading dock door, when the door is in an open position the at least one light is a first color, when the door is in a closed position the at least one light is a second color.

6. The vehicle leveler of claim 5 wherein the sensor automatically changes the color of the at least one light between the first color and the second color depending on if the door is in the open position or the closed position.

7. The vehicle leveler of claim 1 wherein the at least one light are multiple lights installed along a length of each opposing side portion, each opposing side portion having an inside wall surface and an outside wall surface.

8. The vehicle leveler of claim 7 wherein the multiple lights are installed along the inside wall surface.

9. The vehicle leveler of claim 7 wherein at least one light is installed along the outside wall surface.

10. The vehicle leveler of claim 9 wherein the at least one light along the outside wall surface is a white light which illuminates the walkway for a user.

11. A vehicle leveler for use with a substantially flat driveway, the leveler capable of movement between a lowered position and a raised position, the leveler in the lowered position comprising:
 a first portion having a leading edge at a front of the leveler and a substantially flat section wherein the substantially flat section is inclined from the substantially flat driveway at between about 1 and 15 degrees from parallel with the substantially flat driveway;
 a second portion extending from the incline portion toward a rear of the leveler including a substantially flat section wherein the substantially flat section is declined toward the substantially flat driveway at between about 1 and 15 degrees from parallel with the substantially flat driveway;
 an extension portion extending from the second portion toward a rear of the leveler and including a substantially flat section disposed about parallel with the substantially flat driveway;
 opposing side portions which extend the length of and contact the first portion, second portion and extension portion, the opposing side portions having an inside surface, an outside surface and a top surface which forms a walkway; and
 at least one light on the opposing side portions, the at least one light being controlled by a sensor adjacent to a door.

12. The vehicle leveler of claim 11 wherein the at least one light is located on the inside surface and the outside surface of the opposing side portions.

13. The vehicle leveler of claim 11 wherein the door is a loading dock door, when the door is in an open position the at least one light is a first color, when the door is in a closed position the at least one light is a second color.

14. The vehicle leveler of claim 12 wherein the sensor is a proximity sensor and the sensor automatically changes the color of the at least one light between the first color and the second color depending on if the door is in the open position or the closed position.

15. The vehicle leveler of claim 11 wherein the at least one light are multiple lights installed along a length of each opposing side portion, each opposing side portion having an inside wall surface and an outside wall surface.

16. The vehicle leveler of claim 15 wherein the multiple lights are installed along the inside wall surface.

17. The vehicle leveler of claim 15 wherein at least one light is installed along the outside wall surface.

18. The vehicle leveler of claim 17 wherein the at least one light along the outside wall surface is a white light which illuminates the walkway for a user.

19. A vehicle leveler for use with a substantially flat driveway, the leveler capable of movement between a lowered position and a raised position, the leveler in the lowered position comprising:
 a first portion having a leading edge at a front of the leveler and a substantially flat section wherein the substantially flat section is inclined from the substantially flat driveway at between about 1 and 15 degrees from parallel with the substantially flat driveway;
 a second portion extending from the incline portion toward a rear of the leveler including a substantially flat section wherein the substantially flat section is declined toward the substantially flat driveway at between about 1 and 15 degrees from parallel with the substantially flat driveway;
 an extension portion extending from the second portion toward a rear of the leveler and including a substantially flat section disposed about parallel with the substantially flat driveway;
 opposing side portions which extend the length of and contact the first portion, second portion and extension portion, the opposing side portions having a top surface which forms a walkway;
 at least one light on the opposing side portions, the at least one light being controlled by a sensor adjacent to a door; and
 a powered wheel chock and a corresponding wheel chock sensor, the wheel chock sensor indicates when the wheel chock is contacting a wheel of a vehicle.

20. The vehicle leveler of claim 19 wherein the sensor is a proximity sensor.

21. The vehicle leveler of claim 19 wherein the at least one light is located on the inside surface and the outside surface of the opposing side portions.

22. The vehicle leveler of claim 19 wherein the door is a loading dock door, when the door is in an open position the at least one light is a first color, when the door is in a closed position the at least one light is a second color.

23. The vehicle leveler of claim 22 wherein the sensor automatically changes the color of the at least one light between the first color and the second color depending on if the door is in the open position or the closed position.

24. The vehicle leveler of claim 19 wherein the at least one light are multiple lights installed along a length of each opposing side portion, each opposing side portion having an inside wall surface and an outside wall surface.

25. The vehicle leveler of claim 24 wherein the multiple lights are installed along the inside wall surface.

26. The vehicle leveler of claim 24 wherein at least one light is installed along the outside wall surface.

27. The vehicle leveler of claim 26 wherein the at least one light along the outside wall surface is a white light which illuminates the walkway for a user.

28. A vehicle leveler for use with a driveway comprising:
 a first portion having a leading edge and a trailing edge wherein the trailing edge is disposed further from the driveway than the leading edge and forms a ramp section, the first portion having a flat section adjacent the trailing edge, the flat section being disposed about parallel with the substantially flat driveway:
 a second portion having a leading edge and a trailing edge wherein the leading edge of the second portion is removably attached to the trailing edge of the first portion and the leading edge of the second portion is disposed further from the driveway than the trailing edge of the second portion, the second portion also including an extension portion which extends from the trailing edge of the second portion toward a rear of the leveler and includes a substantially flat section disposed about parallel with the substantially flat driveway;
 opposing side portions which extend the length of and contact the first portion, second portion and extension portion, the opposing side portions having a top surface which forms a walkway; and
 at least one light on the opposing side portions, the at least one light being controlled by at least one sensor which can sense when the vehicle leveler is in a lowered position thereby changing the color of the at least one light.

29. A vehicle leveler for use with a driveway comprising:

a first portion having a leading edge and a trailing edge wherein the trailing edge is disposed further from the driveway than the leading edge and forms a ramp section:

a second portion having a leading edge and a trailing edge wherein the leading edge of the second portion is removably attached to the trailing edge of the first portion and the leading edge of the second portion is disposed further from the driveway than the trailing edge of the second portion, the second portion also including an extension portion; and at least one light, the at least one light being controlled by a sensor adjacent to a door.

\* \* \* \* \*